United States Patent [19]
Adams

[11] Patent Number: 5,422,146
[45] Date of Patent: Jun. 6, 1995

[54] PROCESS OF POWDER COATING OF WORKPIECES

[75] Inventor: Horst Adams, Nonnenhorn, Germany

[73] Assignee: Wagner International AG, Alstatten, Switzerland

[21] Appl. No.: 271,164

[22] Filed: Jul. 6, 1994

[30] Foreign Application Priority Data

Jul. 8, 1993 [DE] Germany .................. 43 22 801.1

[51] Int. Cl.⁶ .............................................. B05D 1/04
[52] U.S. Cl. ........................................ 427/475; 427/198;
427/202; 427/265; 427/270; 427/271; 427/348;
427/372.2; 427/402; 427/555; 427/558;
427/559; 427/595; 427/596
[58] Field of Search ............... 427/469, 482, 485, 555,
427/557, 558, 559, 595, 596, 475, 198, 202, 265,
270, 271, 348, 372.2, 402

[56] References Cited

U.S. PATENT DOCUMENTS 5,182,430  1/1993  Lagain ...................... 219/121.63

FOREIGN PATENT DOCUMENTS 0480828  4/1992  European Pat. Off. .
0481869  4/1992  European Pat. Off. .
3429580  2/1986  Germany .
1465146  2/1977  United Kingdom .

*Primary Examiner*—Bernard Pianalto
*Attorney, Agent, or Firm*—Hill, Steadman & Simpson

[57] ABSTRACT

A process of powder coating of workpieces in which initially a workpiece is coated with color powder such that the powder adheres to the workpiece and subsequently the powder is baked in an oven, in which subsequent to coating and prior to baking the powder adhering to the workpiece is irradiated with electromagnetic radiation within a particular, defined surface portion so that the powder within the defined surface portion will gelate and stick to the workpiece, and in which the color powder adhering to the workpiece outside of said defined surface portion is removed subsequent to irradiation.

15 Claims, 1 Drawing Sheet

PROCESS OF POWDER COATING OF WORKPIECES

BACKGROUND OF THE INVENTION

This invention is directed to a process of powder coating of workpieces in which initially a workpiece is coated with powder so that the powder adheres to the workpiece and subsequently the powder is baked in an oven.

The complete, homogeneous (single-color) coating of workpieces with color powder for instance in electrostatic powder coating plants with subsequent baking of the color powder which adheres electrostatically to the workpiece, has been known (DE 3429580 A1, GB 1465146). When it was desired to form a multi-colored pattern on a workpiece the workpiece was covered with an appropriate mask, the respective color powder was applied to the exposed surface area of the workpiece to be coated with said color and subsequently baked by placing the entire workpiece in the baking oven. These steps were then repeated for every further color with corresponding covering masks and color powders until the desired pattern had been fully applied. Apart from the considerable time and energy requirements of said process it also exhibits the particular drawback that the quality of the coating is deteriorated by the multiplicity of baking steps.

EP 0,480,828 and EP 0,481,869 disclose processes of powder coating of workpieces in which a mixture of powder and a neutral gas is injected via a nozzle into a laser beam so that the powder either impinges on a workpiece together with the laser beam or initially passes through the laser beam and thereafter impinges on the workpiece. During this process the powder is melted by the thermal radiation of the laser, and the melted powder is deposited on the workpiece. Alternatively, the powder may also be applied to the workpiece prior to the laser treatment. In said coating process the velocity of the powder stream has to be relatively low so that the laser beam can reliably melt or fuse the powder particles. The relatively high temperatures produced in the process require the use of the neutral gas. Since the laser beam has a limited width such a coating process requires not only much technical effort but is also slow and only suited for relatively small areas.

This invention is based on the objective of providing a process of powder coating of workpieces in which locally exactly defined surface areas of a workpiece can be coated in a simple way. It is a secondary objective of this invention to provide a process in which multi-colored two-dimensional bodies such as images or patterns can be applied onto a workpiece by powder coating without having to subject the workpiece to a plurality of baking operations.

The specified objective is achieved in accordance with the invention by a process wherein powder adhering to the workpiece after coating and prior to baking is irradiated with electromagnetic radiation within a defined surface portion such that the powder present within the defined surface portion will gelate and stick to the workpiece. The color powder which adheres to the workpiece outside of the defined surface portion is removed subsequent to the electromagnetic irradiation step. In the process of the invention the workpiece is initially surface-coated with powder in the usual way, for instance in an electrostatic powder coating plant. Thereupon a desired defined surface portion of the workpiece is irradiated with electromagnetic radiation such as IR-light or UV-light so as to transfer energy to the powder and to initiate crosslinking so that the powder adhering to the workpiece will gelate in said defined surface portion and stick to the workpiece. The color powder adhering to the workpiece outside of the defined surface portion is removed such as by blowing. Subsequently, the color powder is baked in a baking oven. The process according to the invention eliminates the making and using of masks for desired patterns, while a two-dimensional pattern can easily and rapidly be applied to a workpiece surface.

For applying a multi-colored pattern or image to the workpiece surface, the workpiece is successively coated with a respective one of the color powders and irradiated with electromagnetic radiation within the defined surface portion allotted to the respective color. Thereafter any excess color powder outside of the associated surface portion is blown off, and the steps of coating, irradiating and blowing are repeated for each additional color of the workpiece until the desired pattern or image has been formed thereon. Subsequently, the entire color powder is baked in a single operation. With the method of the present invention it is therefore possible to apply a multicolored pattern or image in its entirety to the workpiece, the powder respectively gelling in the individual portions due to the electromagnetic irradiation, and thereafter to bake the pattern or image in a single operation so that the initially coated portions will not deteriorate due to multi-baking of the color powder.

Gelling here means first of all fusing of the powder. To this end, external energy must be transferred to the powder because an endothermal operation will take place. By the use of a laser, for example, the emission wavelength of the source of radiation can be adjusted accurately to the absorption wavelength of the powder so as to enable a highly effective energy transfer. As soon as the powder has changed to the liquid phase, so-called crosslinking will take place, i.e., three-dimensional molecular networks will be formed which finally constitute the homogeneous powder film which is what a powder coat actually is.

In addition to sources of IR-radiation also sources of UV-radiation are suitable for gelling or partial crosslinking of the powder. The important factor when selecting the source of radiation and the applied electromagnetic radiation is that the transferred energy should be able to initiate crosslinking in the powder or fusion of the powder.

The source of IR-radiation may, for example, be an IR-laser or a "Nernst stylus" which sweeps or "scans" the desired, defined surface portion or directly projects the desired pattern on the workpiece.

When an IR-laser is used as the source of IR-radiation it may be coupled directly with a computer for driving the laser or laser scanner so as to transfer a digitised image directly onto the workpiece.

As the source of radiation for partially gelling or partially crosslinking the powder, one may also make use of a source of UV-radiation of the kind used in stereolithography for producing three-dimensional workpiece patterns from liquid synthetic plastics. The chemical crosslinking which occurs in said process is very similar to the powder crosslinking process.

In view of presently feasible technologies and with suitable color powder there is provided electromagnetic irradiation to cause the color powder to gelate, the surface being heated for about 5 seconds at approximately 160° C. The source of radiation is not limited to a particular spectral range. Rather, it is essential that the radiation emitted by the source be adjusted to the absorption occurring within the powder which will initiate crosslinking in the powder.

DETAILED DESCRIPTION OF THE PREFERRED EMBODIMENTS

Figure 1A:
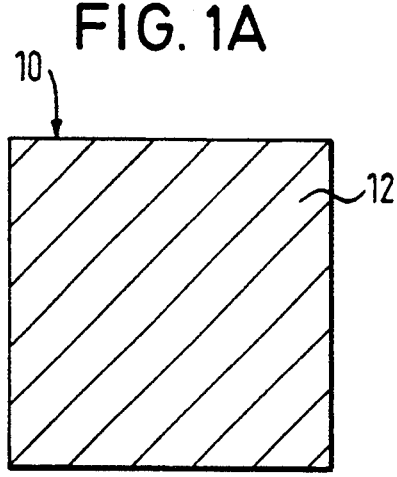
FIGS. 1A, 1B, 1C, 1D, 1E and 1F are schematic plan views which illustrate examples of individual steps of the coating process in which a two-color pattern is applied onto a workpiece.
Figure 1B:
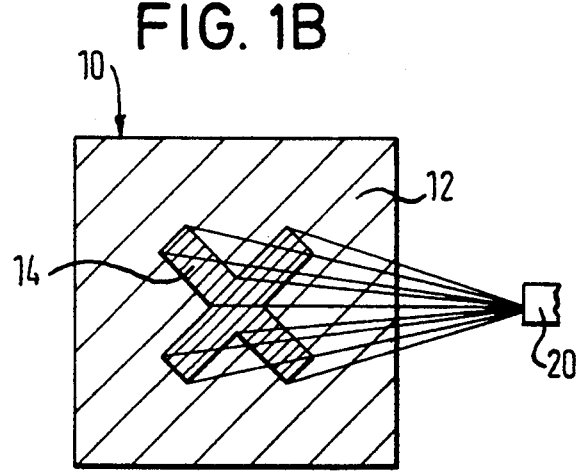
Figure 1C:
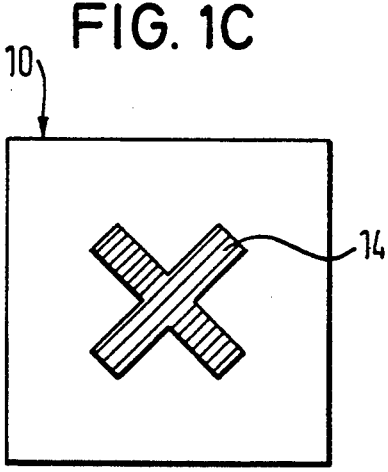

FIG. 1A illustrates a first layer of color powder 12 is two-dimensionally applied to the surface of a workpiece 10 (only a portion of which is shown in FIGS. 1A to 1F) by a known electrostatic coating method. Due to the potential difference between the grounded workpiece 10 and the color powder, which is charged by a high-voltage generator and suitable electrode means (not illustrated), the color powder 12 adheres to the workpiece surface. As illustrated in FIG. 1B, immediately after application of the color powder 12 the surface of the workpiece 10 is irradiated by a suitable source of radiation 20, for instance an IR-laser, within a defined surface portion 14 so that the powder will form a gel due to the energy transferred by the radiation. Consequently the powder in the irradiated surface portion 14 will not only adhere electrostatically to the workpiece but will also stick to the workpiece 10 due to the gelling or caking process. Subsequently, as indicated in FIG. 1C, the workpiece is subjected to a flow of air in order to blow those powder particles which adhere only electrostatically to the workpiece while not sticking thereto, off the surface of the workpiece 10 externally of the defined surface portion 14. Therefore the color powder pattern 14 remaining on the workpiece will correspond to the infrared image projected onto the workpiece.

Figure 1D:
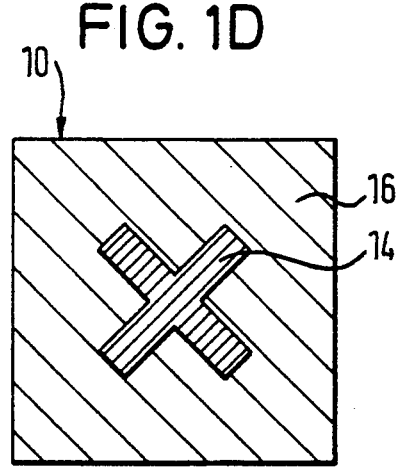
Figure 1E:
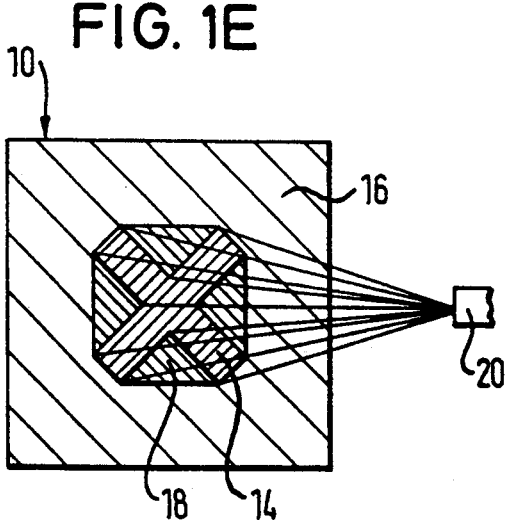
Figure 1F:
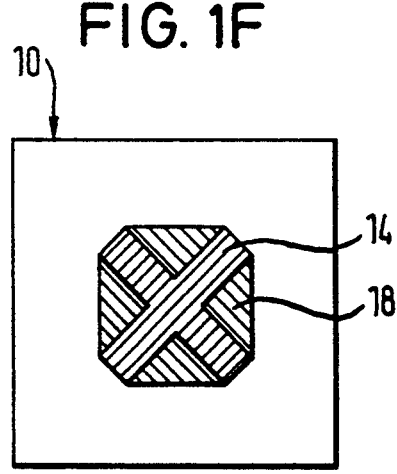

As illustrated in FIG. 1D, in color order to apply a two-color pattern, a second color layer 16 is subsequently applied onto the surface of the workpiece 10 and will also electrostatically adhere to the workpiece 10. As illustrated in FIG. 1E, the same source of radiation 20 then projects the surface portion 18 corresponding to the second color on the surface of the workpiece 10 so that the color powder 16 in said portion will form a gel and stick to the workpiece. Subsequently, and replace "color" with color the color powder particles externally of the second surface portion 18 are blown off so that only the first color powder 12 within the portion 14 and the second color powder 16 within the portion 18, which stick to the workpiece surface, will remain on said surface.

Hence, with the process of the present invention an appropriate focused source of IR- or UV-radiation 20 will not uniformly irradiate the entire color powder-coated workpiece but rather a particular pattern within a defined surface portion 14, 18 is projected onto the workpiece so that energy is transferred to the powder in said portion to initiate crosslinking whereby the powder forms a gel and sticks to the workpiece. Of course, various kinds of patterns with any number of colors can be applied onto the workpiece.

As soon as all color layers have been applied onto the workpiece with the intended shape so as to obtain a desired image or pattern, the workpiece with the gelled color powder thereon is baked in a single operation in a known baking oven (not illustrated).

The radiation sources for irradiating a respective defined surface portion of the powder so as to cause gelling or partial crosslinking of the powder may be those whose emission wavelength can be matched with the absorption wavelength of the used powders. The source may, for instance, be a Nernst stylus with a suitable optical system or an IR-laser whose beam scans the workpiece in line-by-line fashion.

Therefore an IR- or a UV-image may be projected entirely onto the workpiece or may scan across the desired surface portion of the workpiece. When a laser scanner including a suitable control means is chosen as the source of IR-radiation, the scanner may be coupled to a computer so that digitised images can be transferred direct from the computer onto the workpiece.

It is advantageous to heat the surface portion during irradiation to a maximum of about 160° C. for a period of about 2 to 5 seconds.

With today's technologies for electromagnetic sources of radiation and with the known color powders it is intended to heat each surface portion to be coated for a period of 5 seconds to c.160° about. Upon further development of such technologies it would, however, be conceivable that a shorter irradiation period at a lower temperature will suffice to cause suitable color powders to gelate so that they will stick to the workpiece.

Other types of coating in which the process of the present invention can be used are, among others, coating of textile materials (patterns on webs of fabric), coating of wood and coating of ceramic materials (tiles, decoration and china goods). To this end the source of radiation must cause complete crosslinking of the powder so that subsequent baking in an oven is no longer required and the coated materials will not be subjected to unnecessarily high temperatures.

It is possible with the process according to the invention to form different-colored patterns in a relatively simple and easy way. Particularly, the manufacture and use of different masks for different patterns can be omitted because the source of radiation permits all kinds of shapes and patterns to be projected or "scanned" onto the workpiece. In a particularly advantageous embodiment the IR- or UV-image is applied to the workpiece by a computer-controlled laser scanner whereby an extremely flexible coating process is provided which permits the application of various colors and patterns without troublesome adaptations to different kinds of workpieces.

Although the present invention has been described with reference to a specific embodiment, those with skill in the art will recognize that changes may be made thereto without departing from the scope and spirit of the invention as set forth in the appended claims.

I claim:

1. A process of powder coating of workpieces, comprising the steps of:
    coating a workpiece with powder so that the powder adheres to the workpiece;
    irradiating a defined surface portion of the workpiece with electromagnetic radiation to an extent such that powder particles of the powder within the defined surface portion stick together and stick to the workpiece;

removing powder which adheres to the workpiece located outside the defined surface portion; and baking the workpiece in an oven.

2. The process as claimed in claim 1, wherein said step of irradiating is further defined in that the workpiece is irradiated with infrared light.

3. The process as claimed in claim 2, wherein said step of irradiating is further defined in that an IR-laser is used to emit said infrared light and scans the defined surface portion of the workpiece.

4. The process as claimed in claim 3, wherein said step of irradiating is further defined in that the IR-laser is coupled to a computer so as to transfer a digitized pattern directly onto the surface of the workpiece.

5. The process as claimed in claim 2, wherein said step of irradiating is further defined in that a focused Nernst stylus is used to emit said infrared light, said Nernst stylus emitting a flow of energy directed to said defined surface portion of the workpiece.

6. The process as claimed in claim 1, wherein said step of irradiating is further defined in that the workpiece is irradiated with ultraviolet light.

7. The process as claimed in claim 6, wherein said step of irradiating is further defined in that a means for emitting UV-radiation is used to emit said ultraviolet light and emits a flow of energy directed to said defined surface portion of the workpiece.

8. The process as claimed in claim 1, wherein said step of irradiating is further defined in that the emission wavelength of the electromagnetic radiation is matched with the absorption wavelength of the powder so as to initiate crosslinking in the powder.

9. The process as claimed in claim 1, wherein said step of coating the workpiece with powder is further defined in that the workpiece is electrostatically coated with color powder; and the step of removing powder is further defined in that the color powder adhering to the workpiece outside of said defined surface portion is removed by blowing.

10. The process as claimed in claim 1, wherein said step of coating is further defined in that said powder is a first powder having a first color; and comprising the following additional steps:

subsequent to the step of removing, coating the workpiece with a second powder having a second color;

after coating with the second powder irradiating a second defined surface portion with electromagnetic radiation to an extent that powder particles of the second powder present within the second defined surface portion stick together and stick to the workpiece; and after the step of irradiating the second powder, removing second powder which adheres to the workpiece outside the second defined surface portion.

11. The process as claimed in claim 1, wherein said step of irradiating is further defined in that the powder adhering to the workpiece is heated upon irradiation for about 2 to 5 seconds at a maximum of about 160° C.

12. The process as claimed in claim 1, wherein said step of irradiating is further defined in that the powder adhering to the workpiece is heated upon irradiation for about 5 seconds at about 160° C.

13. A process of powder coating a workpiece comprising the steps of:

coating a workpiece with electrostatically charged powder to cover a surface of the workpiece;

irradiating a defined surface portion of the surface to an extent that powder particles of the powder present within the defined surface portion stick together and stick to the surface; and removing powder which adheres to the workpiece outside the defined surface portion.

14. The process according to claim 13 comprising the further step of after the step of removing, the workpiece is baked in an oven.

15. The process according to claim 13 comprising the further steps of;

after the step of removing, coating said surface with a second electrostatically charged powder;

irradiating the second electrostatically charged powder with electromagnetic radiation within a second defined surface portion;

removing the second electrostatically charged powder from the surface which is outside the second defined surface portion.

* * * * *